Patented Oct. 3, 1939

2,174,751

UNITED STATES PATENT OFFICE 2,174,751

NAPHTHINDENONES

Karl Koeberle, Werner Rohland, and Christian Steigerwald, Ludwigshafen-on-the-Rhine, Germany, assignors to General Aniline Works, Inc., New York, N. Y., a corporation of Delaware No Drawing. Application June 12, 1937, Serial No. 147,922. In Germany July 2, 1936

4 Claims. (Cl. 260—367)

The present invention relates to peri-naphthindenones. Peri-naphthindenone itself has the following structural formula:

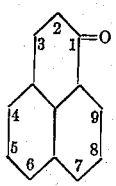

We have found that naphthindenones containing up to two groups

wherein $R_1$ and $R_2$ stand for a member selected from the class consisting of hydrogen and the alkyl, aryl acyl and heterocyclic groups can be obtained by condensing halogenated naphthindenones with arylsulfonic acid amides and saponification of the arylsulfonic-acid-naphthindenone-amides thus formed, or by causing alkylamines, arylamines or heterocyclic amines, or amides of organic carboxylic acids to react with halogenated naphthindenones or by acylation of alkylation or arylation of aminonaphthindenones.

As initial materials for the said reactions, there may be mentioned by the way of example 2-chlornaphthindenone, 2 - bromnaphthindenone, 2,6-dibromnaphthindenone, 2 - chlor - 6 - bromnaphthindenone, 2-aminonaphthindenone and 2-amino-6-bromnaphthindenone.

They may, for example, be prepared by acting on naphthindenones with halogenating agents as described in our copending application Ser. No. 147,920, filed June 12, 1937, now Patent No. 2,145,051, issued January 24, 1939.

The reactions are preferably carried out in the presence of organic diluents, such as isobutanol, amylalcohol, nitrobenzene, mono-, di- or trichlorbenzene or naphthalene and of agents capable of combining with acids such as alkali carbonates, calcium carbonate, magnesium carbonate and alkali acetates and substances favoring the reaction, such as copper compounds. In many cases it is preferable to carry out the reaction under superatmospheric pressure.

The reaction products are generally obtained in a pure state; if necessary they may be freed from any by-products by crystallization, sublimation, crystallization in stages from sulphuric acid or by extracting them with suitable solvents.

The invention will be more fully understood from the following specific examples in which the parts are by weight. It is, however, not limited to these examples.

Example 1

A mixture of 35 parts of 2-chcloronaphthindenone (prepared by reacting glycerine in the presence of sulphuric acid with 1-hydroxy-2-chloronaphthalene), 35 parts of paratoluenesulfonic amide, 30 parts of potassium carbonate, 2 parts of cuprous iodide and 160 parts of amylalcohol is heated to boiling while stirring for six hours. It is then allowed to cool and the red crystals of the potassium salt of para-toluenesulfonic acid naphthindenone(2)-amide separated are filtered off by suction, washed with methanol and water. In order to obtain the paratoluenesulfonic acid naphthindenone(2)-amide itself the potassium salt is suspended in hot water and mineral acid is added. The resulting yellow precipitate is filtered off by suction, washed with water and methanol and dried. After recrystallization from monochlorobenzene the pure para-toluenesulfonic acid naphthindenone(2)-amide is obtained in the form of yellow-brown crystals having a melting point of 218° C.

In order to produce the free amine the toluenesulfonic compound is dissolved in concentrated sulphuric acid and heated while stirring at from 80° to 90° C. for half an hour. The cold solution is then poured into ice-water, filtered in order to separate insoluble ingredients and the filtrate rendered alkaline by sodium hydroxide solution. The free 2-aminonaphthindenone separates in the form of red needles, which are filtered off by suction, washed with water and dried. After recrystallization from methanol the 2-aminonaphthindenone has the melting point of from 127° to 128° C. It dissolves in concentrated sulfuric acid giving a yellow coloration and dyes acetate artificial silk clear orange shades.

The same compound is obtained by employing 2-bromonaphthindenone (obtainable by bromination of naphthindenone) instead of 2-chloronaphthindenone.

If the paratoluenesulfonic acid amide is replaced by an aroylamide, for instance benzoylchloride, 2-benzoylaminonaphthindenone is obtained which yields, after saponification with concentrated sulphuric acid, the same 2-aminonaphthindenone mentioned in the second paragraph.

If 2,6-dibromonaphthindenone (prepared by bromination of naphthindenone) is reacted with para-toluenesulfonic acid amide in the manner described in paragraphs 1 and 2 the 2-amino-6-bromonaphthindenone having the melting point of from 213° to 214° C. is obtained.

*Example 2*

A mixture of 20 parts of 2-aminonaphthindenone, 100 parts of pyridine and 20 parts of benzoylchloride is heated while stirring at from 90° to 100° C. for about an hour. After cooling the mixture is diluted with methanol, the separated yellow crystals are filtered off by suction, washed with methanol and dried. The 2-benzoylnaphthindenone thus obtained dissolves in concentrated sulphuric acid giving a yellow coloration. It dyes acetate artificial silk clear yellow shades.

Corresponding 2 - aroylaminonaphthindenones are obtained by employing substituted benzoylchlorides such as fluor- or chlorbenzoylchlorides, toluylchlorides, alkoxybenzoylchlorides, nitrobenzoylchlorides or naphthoylchlorides or anthraquinon-carboxylic chlorides. Naphthindenones obtainable with the latter acylating agent are in most cases vattable and dye vegetable fibres from yellow to red shades.

*Example 3*

A mixture of 39 parts of 2-aminonaphthindenone, 46 parts of dibromoanthanthrone, 250 parts of nitrobenzene, 30 parts of dry sodium carbonate and 2 parts of copper carbonate is boiled for 20 hours while stirring. After cooling the separated dyestuff is filtered off by suction, washed with methanol and water and dried. The dyestuff thus obtained is probably a dinaphthindenonyl-aminoanthanthrone which dissolves in concentrated sulphuric acid giving a yellow-green coloration. It dyes cotton from a violet vat red-yellow shades.

*Example 4*

A mixture of 50 parts of 2-chloronaphthindenone and 500 parts of a 50 per cent aqueous solution of dimethylamine is heated in a closed vessel at about 150° C. for 10 hours. After cooling the mixture is dissolved in dilute sulphuric acid, the remaining undissolved ingredients are removed by filtration and the filtrate is rendered alkaline. The precipitated 2 - dimethylaminonaphthindenone is filtered off by suction, washed with water and dried. It dyes acetate artificial silk reddish yellow shades.

The corresponding 2-dialkylnaphthindenones are obtained by employing other dialkylamines instead of dimethylamine. The 2-chloronaphthindenone may also be replaced by 2-bromonaphthindenone.

*Example 5*

A mixture of 50 parts of 2-chloronaphthindenone, 100 parts of dodecylamine, 10 parts of sodium carbonate and 5 parts of cuprous iodide is heated at 150° C. while stirring for 3 hours. After cooling, the excess of dodecylamine is removed by distilling the reaction product in vacuo. The inorganic ingredients are removed by treatment with water. The 2-dodecylaminonaphthindenone thus obtained is a red powder which dissolves in concentrated sulphuric acid giving a yellow coloration.

*Example 6*

A mixture of 30 parts of 2-bromonaphthindenone, 50 parts of aniline, 10 parts of sodium carbonate and 0.5 part of cuprous iodide is heated at 180° C. for 8 hours while stirring. After cooling the reaction mixture is diluted with methanol and the separated 2-anilinonaphthindenone is filtered off by suction, washed with methanol and water and then dried. It dissolves in concentrated sulphuric acid giving a green coloration.

In a similar manner the corresponding substituted 2-aminonaphthindenones are obtained when substituted anilines are naphthalines or aminopyridines or aminoquinolines are employed.

*Example 7*

A mixture of 50 parts of 2-bromonaphthindenone, 28 parts of 1-aminobenzene-2-carboxylic acid, 30 parts of dry potassium carbonate, 5 parts of cuprous iodide and 150 parts of amylalcohol is boiled under reflux for 4 hours. After cooling the blue crystals of the potassium salt of the reaction product are filtered off by suction, washed with methanol and water and dried. In order to convert them into the free acid the potassium salt is dissolved in concentrated sulphuric acid and then poured into ice-water. The red precipitate thus obtained is filtered off by suction, washed with water and methanol and dried. It is the 1-(naphthindenonyl-2)-amino-2-carboxylic acid, which after crystallization from nitrobenzene melts between 248° and 249° C. under decomposition.

The corresponding 4-carboxylic acid is obtained when the 1-aminobenzene-4-carboxylic acid is employed instead of the 1-aminobenzene-2-carboxylic acid.

*Example 8*

A mixture of 50 parts of 2-bromonaphthindenone, 45 parts of 1-aminoanthraquinone, 1 part of cuprous iodide, 2 parts of dry potassium carbonate and 250 parts of nitrobenzene is boiled under reflux for 8 hours while stirring. After cooling the separated crystals are filtered off by suction, washed with methanol and water and then dried. The 2-(anthraquinonyl-1-)aminonaphthindenone thus obtained dissolves in concentrated sulphuric acid giving an olive green coloration and a red vat.

With 2-aminoanthraquinone instead of 1-aminoanthraquinone red needles of the corresponding 2-(anthraquinonyl-2)-aminonaphthindenone are obtained which dissolve in concentrated sulphuric acid giving an olive green coloration. Corresponding compounds with similar properties are obtained if the 1-aminoanthraquinone is replaced by substituted 1-aminoanthraquinones for example by 1-amino-4-benzoylaminoanthraquinone, 1-amino-5-benzoylaminoanthraquinone, 1-amino-4-methoxyanthraquinone or 1-amino-2-methylanthraquinone. With 1,9 - pyrazoloanthrone a compound is obtained which dissolves in concentrated sulphuric acid giving a red-yellow coloration.

*Example 9*

A mixture of 50 parts of 2-bromonaphthindenone, 50 parts of 5-amino-1,9-anthrapyrimidine, 25 parts of dry sodium carbonate and 1 part of cuprous bromide is heated to boiling under reflux for 15 hours while stirring. After cooling the separated violet needles of the reaction product are filtered off by suction, washed with methanol and dried. The 5 - naphthindenonylamino - 1,9-anthrapyrimidine thus obtained yields a red vat and dissolves in concentrated sulphuric acid giving a green coloration.

Similar compounds are obtained if other amino-1,9-anthrapyrimidines are employed such as 2-, or 4- or 8-amino-1,9-anthrapyrimidine. Also 4- or 5-amino-1,9-anthrapyrimidones or 4- or 5-amino-1,9-anthrapyridones may be reacted in the same way. With aminodibenzanthrone instead of 5-amino-1,9-anthrapyrimidine, a dyestuff is obtained which dyes vegetable fibres from a blue vat greenish grey shades.

Example 10

A mixture of 6 parts of 2-chlor-6-bromonaphthindenone, 4.5 parts of 1-aminoanthraquinone, 60 parts of nitrobenzene, 5 parts of dry sodium acetate and 0.5 part of copper carbonate is boiled under reflux for 8 hours while stirring. After cooling the reaction compound separated is filtered off by suction, washed with methanol and water and then dried. It dissolves in concentrated sulphuric acid giving a blue coloration. It is the 6-(anthraquinonyl-1-)amino - 2 - chloro-naphthindenone and yields a yellow-red vat.

When using 9 parts of 1-aminoanthraquinone instead of 4.5 parts of 1-aminoanhraquinone the chlorine in the 2-position of the naphthindenone is replaced by the anthraquinonylamino group and the 2,6-di-(anthraquinonyl(1)-)aminonaphthindenone is obtained in the form of violet needles, which dissolve in concentrated sulphuric acid giving a blue coloration.

In a similar manner the 2-chloro-6-bromonaphthindenone may be reacted with one or two molecular proportions of 1,9-pyrazoloanthrone.

Example 11

A mixture of 29 parts of 2-chloro-6-bromonaphthindenone, 22 parts of 1,9-pyrazoloanthrone, 20 parts of dry potassium carbonate and 20 parts of nitrobenzene is boiled under reflux for 2 hours while stirring. After adding 22 parts of 1-aminoanthraquinone and 0.3 part of copper carbonate boiling is continued for about 12 hours. After cooling the reaction product is filtered off by suction, washed with methanol and water and then dried. The new compound thus obtained is most probably the 2-[anthraquinonyl(1)]-amino-6-pyrazoloanthronylnaphthindenone which dissolves in concentrated sulphuric acid giving a red-yellow coloration.

Example 12

A mixture of 17 parts of 2,6-dibromonaphthindenone, 22 parts of 1-aminoanthraquinone, 150 parts of nitrobenzene, 20 parts of sodium carbonate and 1.5 parts of copper carbonate is boiled for 15 hours while stirring. After cooling the separated crystals of the reaction product are filtered off by suction, washed with methanol and dried. The compound is identical with that described in paragraph 2 of Example 10.

What we claim is:

1. A peri-naphthindenone containing up to two groups

wherein $R_1$ stands for a member selected from the class consisting of hydrogen and the alkyl group, and $R_2$ for a member selected from the class consisting of the alkyl and aryl groups.

2. An arylamino-peri-naphthindenone.

3. An anthraquinonylamino-peri-naphthindenone.

4. 2,6 - dianthraquinonylamino-peri-naphthindenone.

KARL KOEBERLE.
WERNER ROHLAND.
CHRISTIAN STEIGERWALD.